(12) United States Patent
Schiller

(10) Patent No.: US 8,996,590 B2
(45) Date of Patent: Mar. 31, 2015

(54) COMPUTERIZED LEGAL CASE MANAGEMENT SYSTEM INCORPORATING RECONCILIATION FEATURE

(76) Inventor: Izzy Schiller, Riverdale, NY (US)

( * ) Notice: Subject to any disclaimer, the term of this patent is extended or adjusted under 35 U.S.C. 154(b) by 257 days.

(21) Appl. No.: 12/290,548

(22) Filed: Nov. 1, 2008

(65) Prior Publication Data

US 2010/0100572 A1  Apr. 22, 2010

Related U.S. Application Data

(63) Continuation-in-part of application No. 11/077,851, filed on Mar. 11, 2005, now abandoned.

(51) Int. Cl.
*G06Q 10/10* (2012.01)
*G06F 17/22* (2006.01)

(52) U.S. Cl.
CPC ............ *G06Q 10/10* (2013.01); *G06F 17/2258* (2013.01)
USPC ........................................................ 707/805

(58) Field of Classification Search
USPC ........ 705/2, 4, 7, 22, 24, 310, 311, 404, 7.22, 705/7.24
See application file for complete search history.

(56) References Cited

U.S. PATENT DOCUMENTS

| | | | |
|---|---|---|---|
| 5,329,447 A | 7/1994 | Leedom, Jr. | |
| 5,956,687 A | 9/1999 | Wamsley et al. | |
| 6,430,581 B1 | 8/2002 | Mahoney et al. | |
| 6,549,894 B1 | 4/2003 | Simpson et al. | |
| 6,694,315 B1 | 2/2004 | Grow | |
| 6,970,842 B1 * | 11/2005 | Ashby | 705/38 |
| 7,653,631 B1 * | 1/2010 | Lundberg | 707/636 |
| 2002/0048369 A1 * | 4/2002 | Ginter et al. | 380/277 |
| 2002/0111953 A1 * | 8/2002 | Snyder | 707/101 |
| 2002/0161733 A1 * | 10/2002 | Grainger | 706/45 |
| 2003/0182169 A1 * | 9/2003 | Kalmick et al. | 705/8 |
| 2003/0204430 A1 | 10/2003 | Kalmick et al. | |
| 2003/0208719 A1 * | 11/2003 | Fay, Jr. | 715/507 |
| 2004/0019496 A1 | 1/2004 | Angle et al. | |
| 2006/0075479 A1 * | 4/2006 | Hagedorn et al. | 726/11 |

* cited by examiner

*Primary Examiner* — Hosain Alam
*Assistant Examiner* — Reza Hosseini
(74) *Attorney, Agent, or Firm* — Ohlandt, Greeley, Ruggiero & Perle, L.L.P.

(57) ABSTRACT

A method for docketing and reporting activities related to a legal case by first establishing a database in a computer memory for storing case data comprised of a plurality of docket records associated with the legal case. The database is then populated with one or more docket records. A court sourced alert associated with the legal case is received via a communications network and loaded into the database. A docket report listing and identifying at least one docket record and the court sourced alert is generated and displayed to a subscriber or user. The user may then reconcile the court sourced alert with the docket record and the displayed docket report listing is modified to indicate that the court sourced alert has been reconciled with the docket record.

7 Claims, 18 Drawing Sheets

| Court Alert CM/ECF | | | | | | |
|---|---|---|---|---|---|---|
| Court Fees/ Rules | Forms | Links | CourtAlert Website | SDNY Pacer Website | | |

Demo Firm  IZZY SHILLER

CourtAlert CM/ECF

Power Search - Enter Index Number, Name or Client#
[    ] Go

CourtAlert Notices
ECF/Pacer Notices

My Cases
All Cases
Add a Docket
Add a New Case

Add a Case Diary
Change Case Header
Query
Reports — 202

Settings
Help
Exit

Court Alert CM/ECF [Sign Out]

Please Select a Case

| Case ID | Index Number | Court | Venue | Main Plaintiff | Main Defendant |
|---|---|---|---|---|---|
| 9414 | CV-94-1303-W | USDC | ALND | CECIL DURRETT, JR. | UPJOHN COMPANY |
| 9413 | CA 94-342 | USDC | DE | GENETICS INSTITUTE, INC. | ORTHO PHARMACEUTICAL |
| 9412 | 117430/94 | NY SUP | New York | ROGER ERONY | ALZA CORPORATION |
| 9411 | 11781/94 | NY SUP | Queens | PAUL BAILEY | ARTS & ENTERTAINMENT |
| 9410 | 99-1007 | US COA | 7CA | BRAND NAME PRESCRIPTION | |
| 9409 | 94 Civ. 897 | USDC | ILND | BRAND NAME PRESCRIPTION | |
| 9408 | 95-7674 | US COA | 2CA | MARY G. FAVIA | BRONX COUNCIL OF THE |
| 9407 | 14096/93 | NY SUP | Westchester | JOYCE GRUENBERG | |
| 9406 | 95-5129, 5600 | US COA | 6CA | EMMA CRAFT | VANDERBILT UNIVERSITY |
| 9405 | 95-1284 | US COA | FC | ETHICON ENDO-SURGERY | RICHARD-ALLAN MEDICAL |
| 9404 | C2-94-0501 | USDC | OHSDC | ETHICON ENDO-SURGERY | RICHARD-ALLAN MEDICAL |
| 9403 | 96-09544 | NYAD | AD2 | TANYA ORR | DR. BARRY A. MEISEL |
| 9402 | 08389/94 | NY SUP | Westchester | TANYA ORR | DR. BARRY A. MEISEL |
| 9401 | 04-8420CD22 | | DCFL | MILO COSMETICS LIMITED | DOLLAR TIME INC |

[Delete Case]

Or Search for the Case
(Enter Index Number or Internal Case ID in [] or Party Name and Click on Search.)

[                    ]  [Search]

[Dockets for this case]  [Return]

COMPUTERIZED LEGAL CASE MANAGEMENT SYSTEM INCORPORATING RECONCILIATION FEATURE

RELATED APPLICATIONS

The present application is a continuation in part of patent application Ser. No. 11/077,851, field on Mar. 11, 2005 now abandoned and claims priority thereof under 35 U.S.C. §120.

FIELD OF THE INVENTION

This invention generally relates to the field of docket tracking and scheduling for the legal profession and, more specifically, to a computerized legal case management system.

BACKGROUND OF THE INVENTION

Attorneys and other members of the legal profession are required to take certain actions in accordance with deadlines established by various statutes and court rules. Members of the legal profession place great emphasis on meeting these deadlines as the failure to adhere to such deadlines can have significant consequences for the attorneys' clients. Rather than relying on memory or the use of a personal calendar, many professionals within the legal industry use some form of a docketing system, often a computerized docketing system to track and notify legal professionals of the upcoming deadlines. In addition to tracking deadlines, conventional computerized docketing systems record all activities occurring for a number of cases. The accuracy and use of a computerized docketing system is of paramount importance to practicing litigation attorneys.

There are many commercially available case management systems, many of which provide for the docketing of events, manual recording of future tasks and deadlines, and notification to users regarding upcoming events. One such commercially available system is known as the MA-3000™. system, associated with the New York Law Journal. This system includes both a basic docketing system and a search of a daily industry newspaper.

There also exist service organizations that electronically or manually monitor pending court cases and provide notification, for example, via electronic mail, of activity recorded by the court for certain identified (or "watched") cases. When information regarding a watched case becomes available, an alert is generated and distributed to interested subscribers. In addition, some existing service organizations attempt to locate any court documents, for example, a court decision or order, and deliver a copy of the document to the subscribers, along with the alert. As an alert may be generated in advance of the availability of the court document, there may be a period of time between the delivery of the alert and the delivery of the actual document associated with such alert. It is common for both alerts and associated court documents to be delivered to subscribers in electronic form via an electronic mail message. It is also common for these existing systems to provide additional information related to the operation of court systems, such as a calendar for one or more judicial officials or information on court rules and procedures. The electronic mail alerts from the service organization may interface with the above-described case management system or with a software module developed by the service organization and maintained on a user's computer system. In addition, the service organizations may host a web site that may be used by law firms, law departments, and the like to retrieve case information. The website may also provide court rules, forms and other similar information. One such service organization is CourtAlert.com, Inc., CourtAlert®

In a typical large law firm or law department, a managing clerk or paralegal is responsible for managing and tracking the docket reports for a large number of legal cases. It is typical for this clerk to receive information from a variety of sources, such as other professionals assigned to the case, and the service organizations described above, enter the information in a computerized docketing system, track important due dates, and advise various team members regarding the status of the cases and upcoming due dates. This clerk typically uses the above-described computerized legal case management system. For example, the clerk may receive an alert from CourtAlert and manually enter or cut-and-paste the information from the alert into the case management system.

It is difficult using the available docketing systems to readily integrate information together—for example, information recently provided by a service organization with information previously contained in the docketing system. Furthermore, in addition to accurately tracking and reporting important due dates, it is important that the case management system not over report activities, i.e., by ensuring that a single deadline or event is not needlessly reported to case members multiple times. It is, therefore, needed that there is a choice and a way to remove reported events and deadlines, automatically or otherwise, from the schedule of events and deadlines.

Thus, there is a strong need for a system that allows a user to integrate and reconcile court sourced information, such as derived from alerts received from service organizations, with pre-existing docket records within the computerized docketing system. Preferably, such a system would be integrated into a computerized docketing system that permits users to reconcile information, update or create new docket records, customize forms according to user need, create new cases and new docket records to include user specific fields of information, collect and collate together docket records, cases, documents, remove, edit and revise documents, keep a track of revisions, and create or modify, diary entries, track revisions in docket entries, and apprise case team members with respect to the updated information.

SUMMARY OF THE INVENTION

In one aspect of the invention, a method is provided for docketing and reporting activities related to a legal case by first establishing a web-enabled database in a computer memory for storing case data comprised of a plurality of docket records associated with the legal case. The database is then populated with one or more docket records. A court sourced alert associated with the legal case is received via a communications network and loaded into the database. A docket report listing and identifying the at least one docket record and the court sourced alert is generated and displayed to a subscriber or user. The user may then reconcile the court sourced alert with the docket record and the displayed docket report listing is modified to indicate that the court sourced alert has been reconciled with the docket record and modifying the displayed docket report listing to indicate that the end sourced alert has been reconciled with the docket record by concealing from display the court sourced alert.

The invention also provides a method and system for receiving emails, dissecting emails to obtain court related information for a docketing system such as court name, index and description of the document, dates in a docket and a picture PDF, and the inclusion of the information dissected into the dockets. For example: Email notifications from Electronic Case Filing courts can automatically be intercepted, analyzed, and made available for reconciliation and inclusion in the dockets.

The method and system provides for operation by a human operator.

The invention permits searching a PDF file for full text, docket entry and any word on the document.

The invention provides for easy entry with information as to the type of document, lookup capability, identifying the author of the document, the person who directed that the document be written, and how the document as received. The invention will also ascertain how the document is received. The postmark for the document will be locatable, and displayed additional comments can be entered by hand in the docket.

The invention permits court alert as well as the court to email to the system and also for emailing into the docket entry.

The invention provides for a web interface. New docket dates will be available immediately. Diary alerts can be entered. The system of the present invention can send emails to Court Alert via computer. The option to include docket entries into an existing entry is provided by the invention with links to PDF files.

In addition, entries can be sent to blackberries as an appointment. The invention also will be available to go into Microsoft Outlook of an adjoined date and to interface with the blackberry.

A record of a document will be available through interne connection and images of the docket deadline will be available as well.

The invention will permit outside access to the internal firm docket. Thus, a user can view everything internally to the firm remotely.

A three element docket can be utilized; displays and email notifications from the system can include the docket text, one or more deadlines ("diaries") and a PDF image of the documents, The invention can also include various formats of calendars and show when a calendar deadline is emailed to another person. A diary will provide entry of court rules on responding to the paper/document.

The invention provides for data conversion from Pacer to entry into the invention's system.

In another aspect of the invention, a case management system for docketing and reporting activities related to a legal case having a computer including a database in a computer memory of the computer for storing case data having a plurality of docket records associated with the legal case is provided. The database may be populated with at least one docket record; a communications network for receiving a court sourced alert associated with the legal case. The database may be adapted to have loaded therein the court sourced alert. The computer generates and displays a docket report listing and identifying at least one docket record and the court sourced alert. The computer may indicate the reconciled court sourced alert with the docket record. The computer may also modify the displayed docket report listing to indicate that the court sourced alert has been reconciled with the docket record by concealing from display the court sourced alert.

The docket record may be updated with information contained in the court sourced alert and users or subscribers of the system may be notified of the updated docket record. In addition, a diary entry based on the information contained in the updated docket record may be created by the docketing clerk and periodically distributed to other users in the law firm or legal organization. A docket report may indicate those court sourced alerts that remain unreconciled with any docket records. The method may be implemented as a computer program executing on one or more processors.

BRIEF DESCRIPTION OF THE DRAWINGS

These and other features, aspects and advantages of the invention will become more fully apparent from the following detailed description, appended claims, and accompanying drawings, wherein each of the drawings illustrates a feature of the case management system in accordance with an exemplary embodiment of the present invention, and wherein:

FIGS. 3-6 are a series of screen captures illustrating the process to add a new case to the case management system;

FIGS. 7-10 are a set of screen captures of pages of the case management system illustrating the process for creating a new docket record;

FIG. 11 is a screen capture illustrating the process of adding a diary entry using the case management system;

FIGS. 12-15 are a set of screen captures of pages of the case management system illustrating the reconciliation feature of the present invention;

FIGS. 16-17 are screen captures of the case management system illustrating the inquiry feature.

These drawings are provided for illustrative purposes only and should not be used to unduly limit the scope of the present invention.

DESCRIPTION

Figure 1:
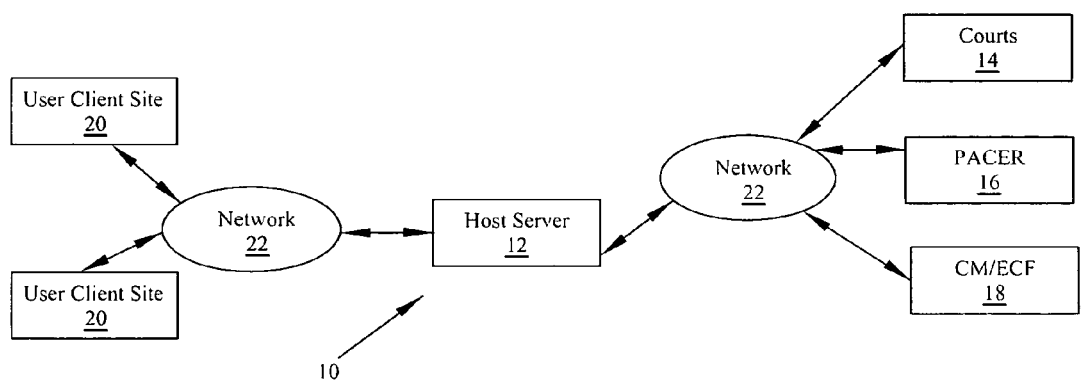
FIG. 1 illustrates a case management system in accordance with an exemplary embodiment of the present invention.

A computerized legal case management system 10 in accordance with one embodiment of the present invention is illustrated in FIG. 1. The case management system 10 includes a host server 12 having one or more docketing databases for storing case data that includes docket records associated with one or more legal cases. The docketing database is populated with information available from at least four entities: information obtained from courts 14 via an alert system, information available over the PACER system 16, information available through the CM/ECF system 18, and information provided by subscribers at user client sites 20, which may include a conventional desktop computer system. The PACER and CM/ECF systems are described below. Information may be exchanged with the docketing database associated with the host server 12 via a conventional computer network 22 or the Internet. The user client sites 20 may include thick client users, such as a PC connected to the network for the managing clerk or thin client users via local or remote inquiry. The docketing database may be replicated or partially stored on one or more of the client sites.

Figure 2:
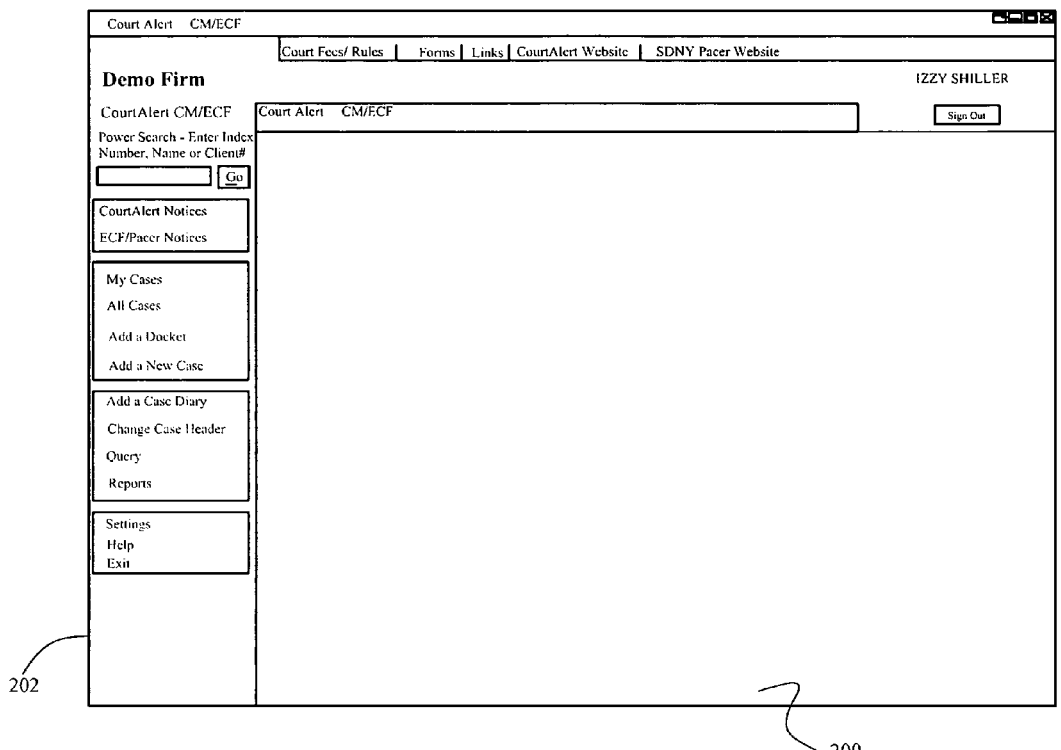
FIG. 2 is a screen capture of an initial page for the case management system.

FIG. 2 is a screen capture of an initial page 200 for the case management system 10 as accessed at a user client site 20. The case management system 10 may be accessed at a client site 20 through a network. Alternatively, the system 10 may be partially or wholly installed on a computer system at a client site 20. The initial page 200 controls access to the case management system 10 in a conventional manner, for example through the use of login identifiers and passwords. From the initial page 200, a user at a client site 20 can access and manipulate the information stored in the one or more docketing databases associated with the case management system 10. Interaction with the case management system 10 and its databases may be implemented in a conventional manner such as using display objects, i.e., buttons or icons displayed on the side bar 202 of the initial page 200. As illustrated in FIG. 2, these choices may include options to access and manipulate user entered dockets, court sourced alerts originating with the PACER system or the CM/ECF system, and court sourced alerts derived from a service organization, such as CourtAlert. The initial page 200 may include a number of display options for adding or manipulating the data within or associated with the docketing databases, including adding cases, docket entries, and diary entries, as well as formulating queries and reports. Some of these options are relatively common on conventional computer-based docketing systems and will not be described in detail as their implementation and use are already known to those skilled in the art. As will be described below, the display options depicted in side bar 202 are used to activate certain features of the system.

Figure 3:
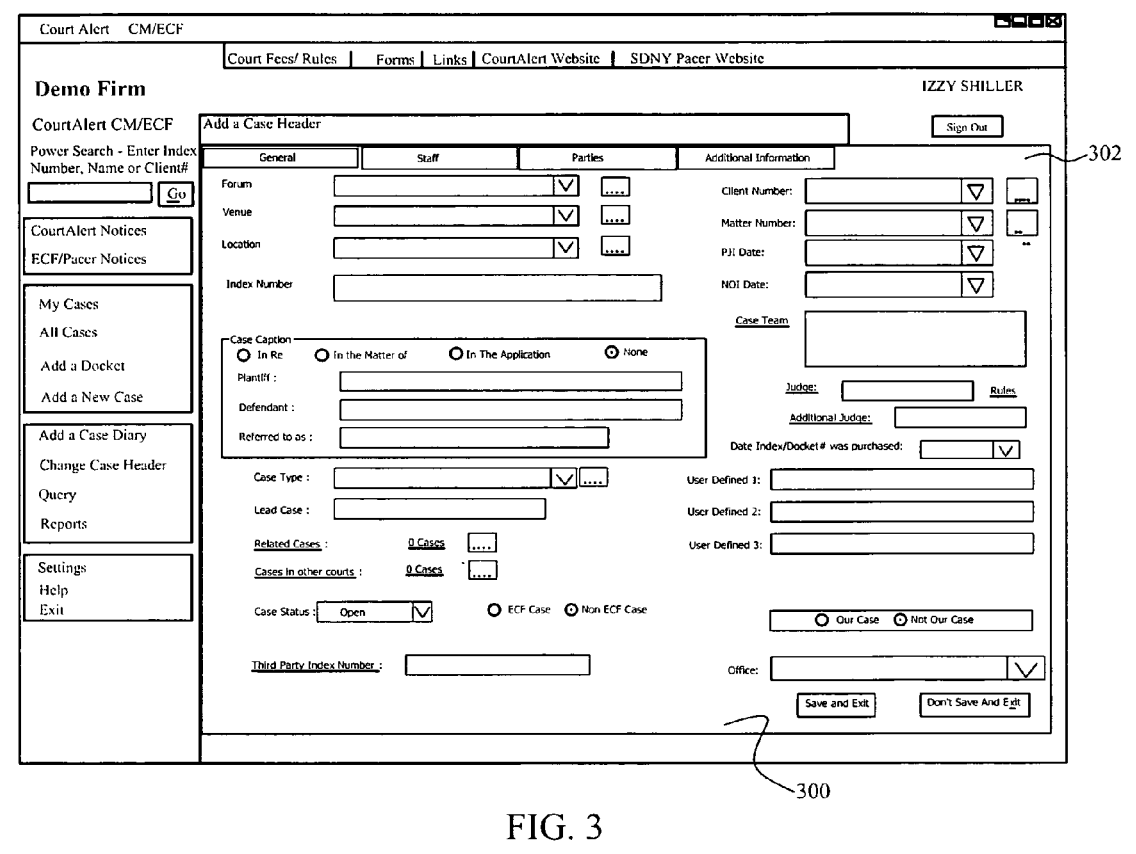

FIGS. 3-6 are a series of screen captures partially illustrating user interfaces to the process to add a new case to the case management system 10. Each screen capture corresponds to a display generated by the case management system 10 and presented on a computer at a client's site 20. The displays include conventional icons which may be selected or activated by a point and click operation or other similar means to direct the case management system to a desired operation. The new case screen 300 as depicted in FIG. 3 may be accessed by selecting the Add a New Case option 202 from the initial login screen or another appropriate screen.

As illustrated in FIG. 3, once at the new screen 300, selection of one of the display objects along top bar 302 presented at the top of the screen, provides for a drop down menu that allows the user to enter case records, for example, certain information relevant to the docketing of the legal including the court venue, location and judge assignment, a court generated index or case number, identification of the parties and type, identification of the type of case and related case information, a client and matter tracking number, a list of team members, and other relevant information. For example: The drop down menu lists the following choices: Forum, Venue, Location, Judge, Close and Exit. These fields allow for the addition or removal of a forum, venue, location or judge. The entry will then appear in a pull down menu in "New Case Holder".

The "New Case" created or added are based on templates provided by the system 10. However, in addition, the system also provides users the facility to create templates that suit their individual needs. The users can add new or more fields of information to the template. The fields may include information such as precise description of the case, a list of the law firm staff members associated with the case, a list of all legal parties of the case and which firm represents each party, any number of classification of the case and a list of the law firm staff members that should not be disclosed any information about the case due to possible legal conflict. Additional fields can added according to not only user needs but also case needs. The user can also assign tags and categories to the new cases that are created. The user can also link together various documents to form a comprehensive case journal or docket.

The information contained in the case records may be entered into the fields illustrated through various operations of the case management system. For example, the information may be partially supplied through the use of drop-down menu selections, as previously described or alternatively may be copied from prior entries. All of this information keyed or copied in by the user is stored in the searchable docketing database.

Figure 4:
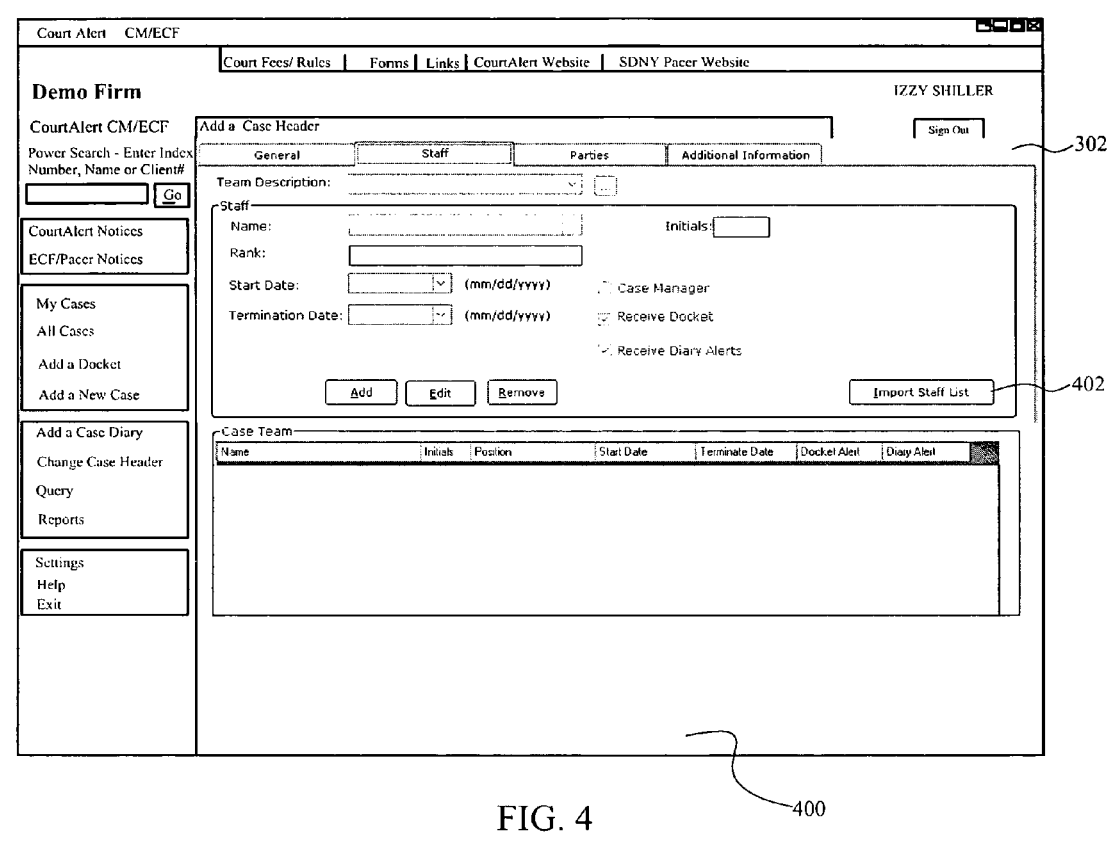
Figure 5:
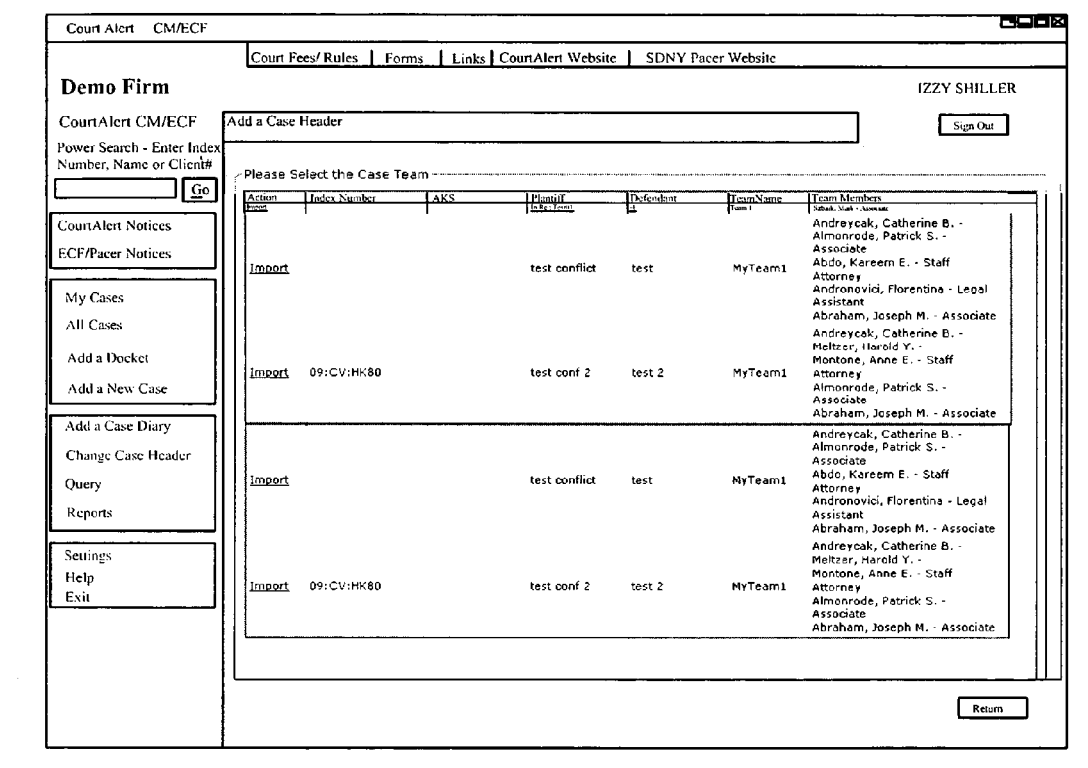
Figure 6:
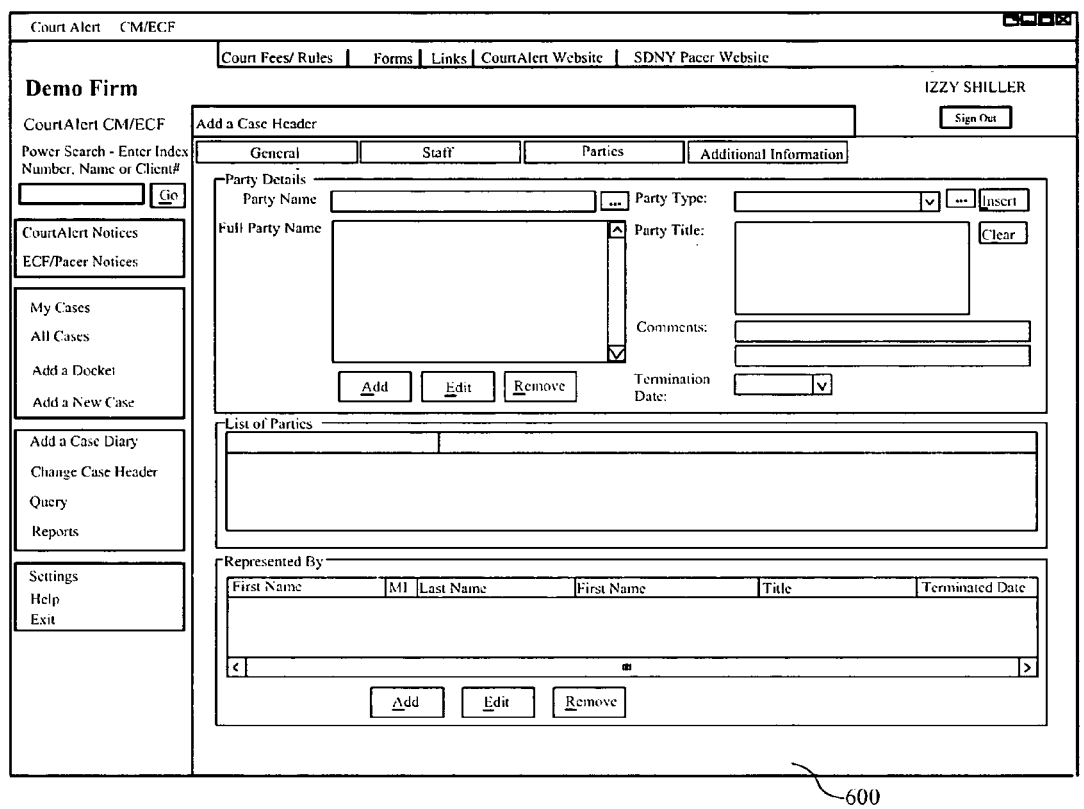

FIG. 3 depicts a screen used to enter certain case related information into the docketing database to build a case record. As illustrated in FIG. 4, selection of the staff display object within top bar 302 pulls up a staff screen 400, which allows the user or subscriber to include information regarding the individual legal professionals assigned to the case. Again, this information may be keyed in the available windows, selected from pull-down menus, or copied from other sources as in a conventional web-based application. The staff screen 400 may include an option, 402 to import a staff list from an existing case within the database. As illustrated in FIG. 5, selection of option 402 allows the user to select staff from previously defined cases: As illustrated in FIG. 6, selection of the parties display object from the top bar 302 pulls up a parties screen 600, which allows the user to enter information regarding the parties to the selected case and the law firms that represent each party.

The system also includes a process to add a case to a watch list. As discussed above, a watch list includes cases for which the user or subscriber requests that a service organization monitor and provide court sourced alerts containing information related to the status of the case—for example when pleadings are filed or when orders are issued by the court. Using the system 10, the user can create a variety of watch lists depending upon the court. Courts have different docketing needs, and therefore, a different docketing system. The web form is designed taking into consideration docketing needs of each court. Depending upon the court selected by the user, a web form, specifically designed for the selected court, may be presented to the user. The details to be filled range from input fields for selecting court and county and inputting index number of the case. Whereas, in cases of some courts, the web forms may include input fields for providing docket numbers. Users can also add a case to watch list after viewing documents pertaining to that case. The users can also maintain and view the list of recent watch lists and alerts that they have received. Recent watch lists and recent lists are provided for every court covered by the legal case management system and CourtAlert. The system also provides document views ranging from snapshot view to full document view to the user.

The case identified by the user is automatically added to the watch list of the appropriate service organization. From that point, the user or subscriber will automatically receive information related to the case via, for example, electronic mail notifications.

Watch Lists pertaining Public Access to Court Electronic Records (PACER) can also be obtained. Requisite details are filled in the webform provided for the purpose and the information is fetched from the database.

Figure 8:
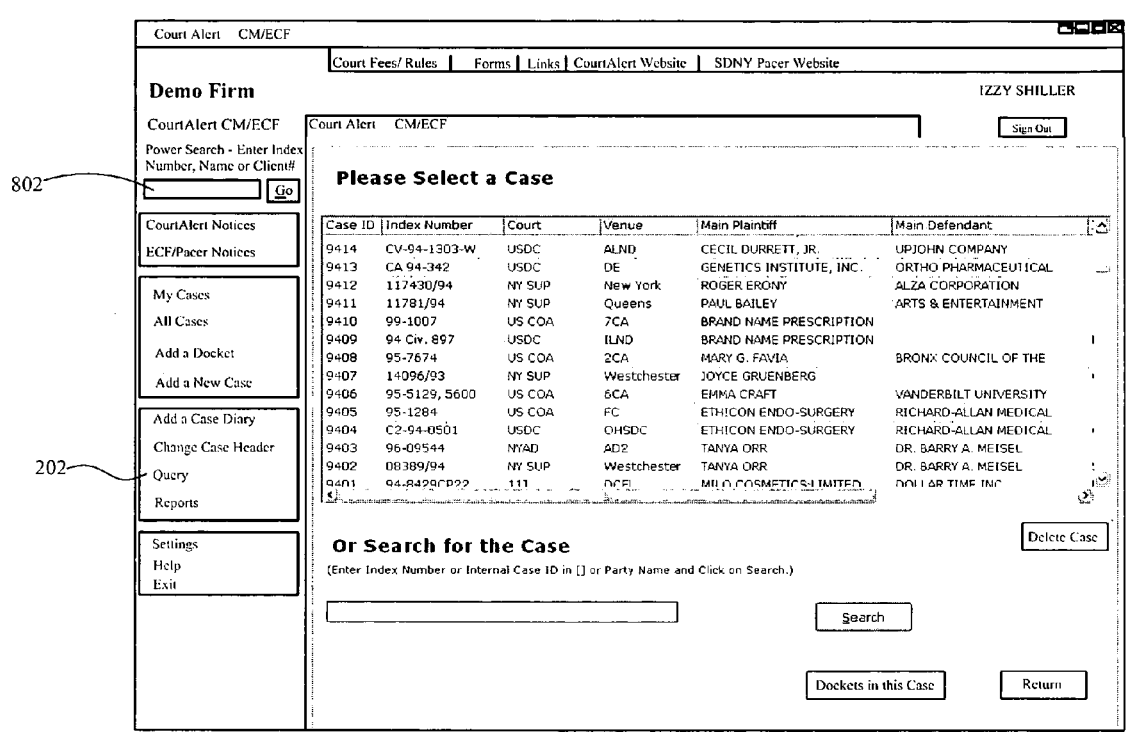
Figure 9:
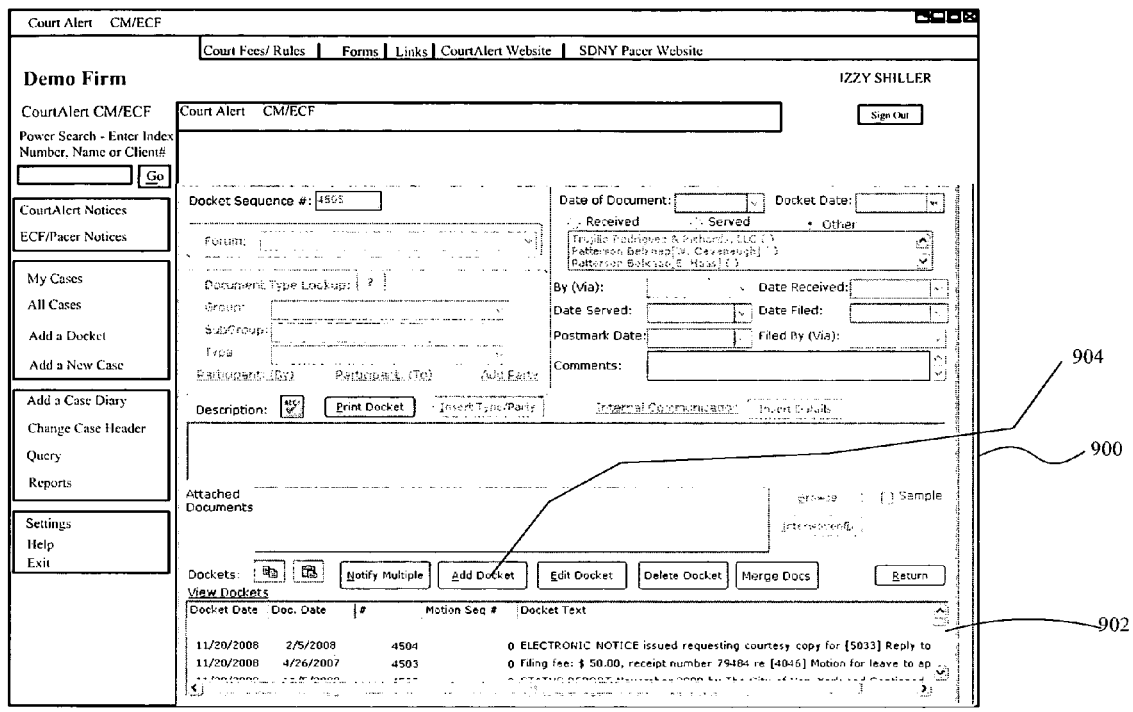

FIGS. 7-10 are a set of screen captures of pages of the case management system 10 illustrating the process for creating a new docket record or diary entry. This process may be invoked by selecting the "Add a Docket" display option from side bar 202. Selection of this option brings up a screen 700 as illustrated in FIG. 7, which shows a list of previously entered cases. The user can select one of the cases in order to create or update a docket record or a diary entry by using conventional selection methods such as double-clicking on one of the case entries using a computer mouse or by scrolling up/down to highlight one of the cases and then selecting the enter key. Alternatively, as illustrated in FIG. 8, the user can use the search window 802 to search by case name, court assigned index number, customer assigned client and matter number, or by specific words included in the docket entries of previously entered cases. As illustrated in FIG. 9, selection of a case brings up a window in which the user may toggle between reviewing, creating and/or updating a docket record or a diary entry. In the example illustrated in FIG. 9, a docket record screen 900 is displayed to the user. As shown in FIG. 9, the user can select one of the docket entries at the bottom of the screen (in the area labeled 902) for modification or can create a new docket entry by completing the information in the windows displayed in the upper portion of the docket record screen 900 by using drop-down menus or by entering information manually. Some of this information may be provided to the user for selection via pull-down menus, or it may be copied from other docket records. As illustrated in FIG. 9, the information contained in a docket record may include those items depicted in FIG. 9 such as, for example, the description of the document, and the date and sequence number of the record, how a document was received or transmitted, from or to whom the documents was received or sent, the date the document was received and filed, comments, and other relevant information. As is common on web-based applications, additional display objects for the user/subscriber to select are included such as add, edit, and delete functions.

Figure 10:
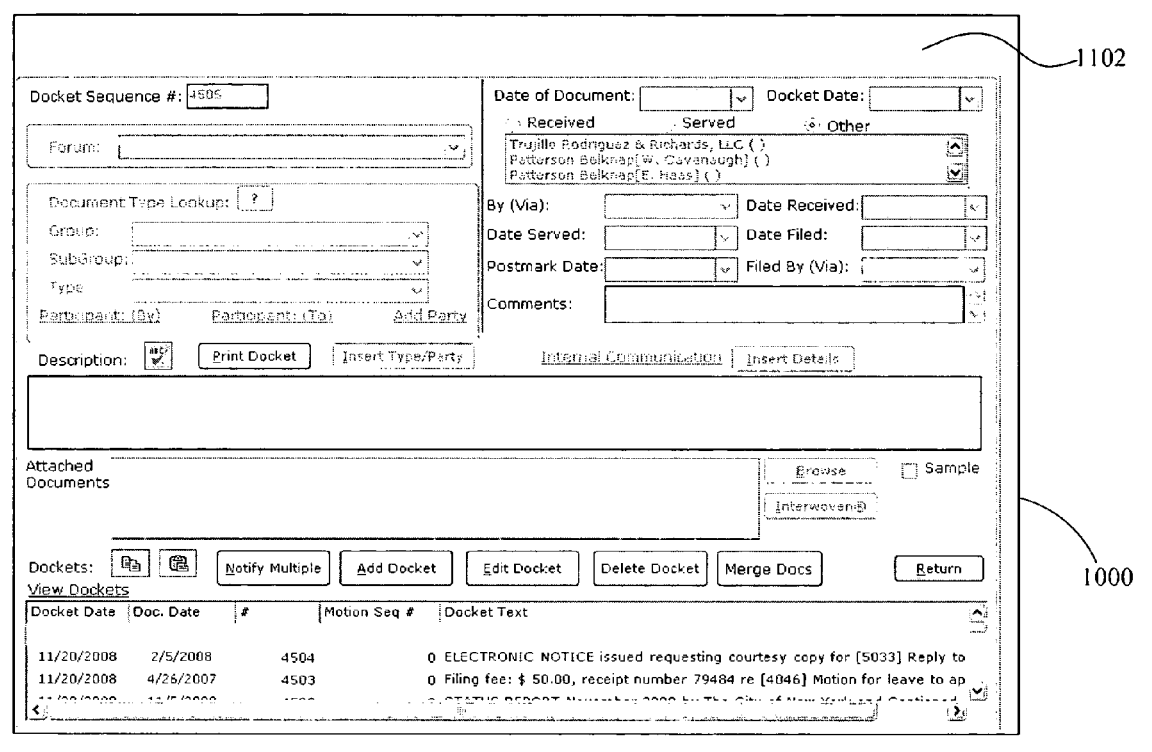

Selection of the Add Docket option 904 brings up a new docket screen 1000 as illustrated in FIG. 10. The system allows a user to enter in various data relating to the new docket record including the document date, the document type, the author, the party, the method of service, and other details or comments. The user may also attach one or more files to a docket record. The file, such as a PDF image file, text files, video or audio files may be attached to a record using convention means such as using a browse function or through API with document management systems.

Figure 11:
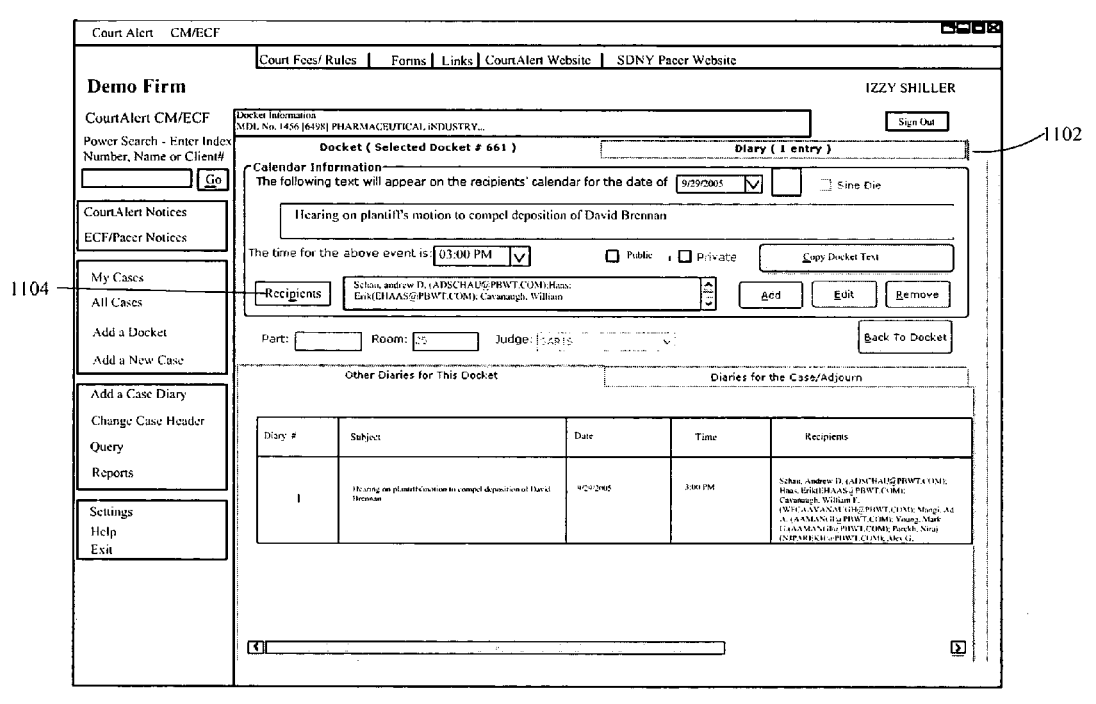

The case management system 10 also allows users or subscribers to include and distribute diary entries associated with a case. FIG. 11 is a screen capture illustrating the process of adding a diary entry using the case management system, which may be accessed from the diary display option 1102 located at the top of the screen. Using the case management system, a user can enter diary entries with future assignments and due dates. The system will then send the docket and due date reminders to other users working on the associated legal case. A diary entry may include a date, a task and a list of team members to receive the diary alert, such as through an electronic mail notification, and other related information. The system 10 can also send alerts to a variety of mobile phone service providers or carriers. The user can subscribe for this service by giving his/her phone number.

Users can add cases for receiving court numbers. Users can add clients, names, and entities, and receive court alerts about cases involving them. Users can find new filings that include their areas of interest or practice areas or clients or competitors of their clients.

A list of possible recipients for the diary entry as illustrated in FIG. 11 may be accessed by clicking on the Recipients option 1104 on FIG. 11 for a diary related to a docket record.

Information stored within the docketing database may also be obtained from a court sourced alert generated by a service organization (e.g. CourtAlert). As is known, such service organizations obtain and distribute information from the court systems on a regular and periodic basis—typically electronically using File Transfer Protocol (FTP), ASP upload, or other similar methods. As an alternative, information can be obtained from court systems in a partially manually operated system, such as by using an optical character recognition (OCR) process using court provided listings. It may be necessary to verify the information after uploading from the OCR process. Information may also be obtained from the federal court's Public Access to Court Electronic Records (PACER) system, which permits the general public, for a fee, to obtain and view documents that have been filed with the court in certain civil cases.

In addition, many federal courts permit attorneys to file documents with the court electronically using the Case Management\Electronic Case Files (CM\ECF) system. Upon receipt of such an e-mail, the system will automatically determine which case the notice is related to base on identifying information such as the court and docket number. The system then determines if any of the header information, such as identification of parties, attorneys, judge, etc., has been modified and, if so, a record will be created and stored as a court sourced alert of a particular internal type of alert referring to header changes. The case management system will also extract the actual docket text from the incoming ECF message and will create a database record within the docketing database representing another internal type of alert referring to a new docket record. The case management system will further extract any associated document images and link the images to the new docket text. As described below, the new court sourced alerts received from the CM/ECF system, as well as their associated document images will be displayed to the user at a client site as alerts available for reconciliation with previously entered docket records for the same case.

A court sourced alert may contain a variety of types of information or data elements including date, court docket or case number (index number), case caption, document type (e.g., opinion, judgment, decision, order, memo endorsed, stipulation, other), opinion number, and possible other references and notes.

FIGS. 12-15 are a set of screen captures of pages of the case management system illustrating the reconciliation feature of the present invention. Reconciliation is the process of connecting, linking or associating court sourced alert information with pre-existing docket records. In other words, the process of reconciliation links together the existing docket records created when a document is created by the user or when a document is served upon the user with information received from the court. For example, a user may use the reconciliation feature to verify that a document (e.g., a motion) he or she previously prepared and filed with a court has indeed been received and entered by the court. Thus, the user will be able to reconcile the user docket record created when the document was prepared and filed with the information received from the court that indicates that the document was received and entered by the court system. Based on the reconciled information, the user may be able to then update the pre-existing docket record (for example, by including the date that the document was received by the court in the record), send the updated docket to members of staff and others, and create new diary entries.

Figure 12:
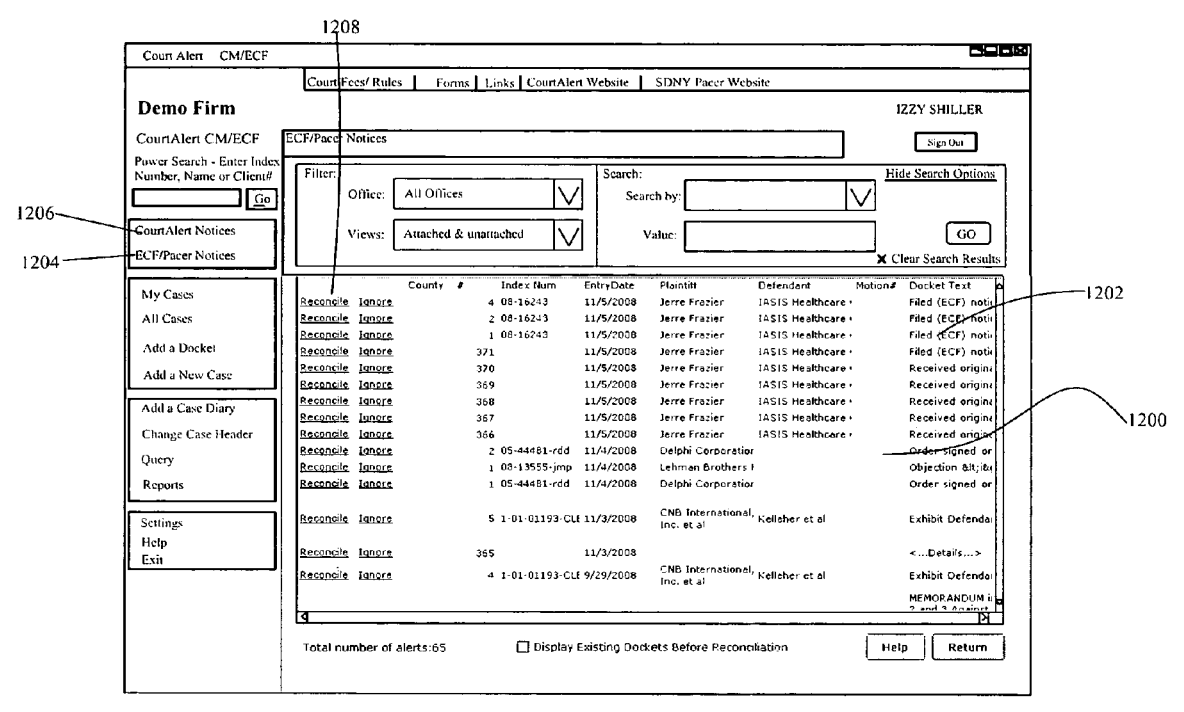

As illustrated in FIG. 12, when a user selects the reconciliation display option for the case management system 10 (for example, by selecting either CM/ECF notices option 1204 or CourtAlert (i.e. service provider) notices option 1206, a reconciliation screen 1200 is provided, which lists all of the court sourced alerts 1202 available for reconciliation. Court sourced alerts 1202 may arrive at the host server 12 and be available for processing in a number of ways. For example, a service provider may convey the information to the host server 12 and its database as part of a file transfer in connection with the e-mail alerts sent directly to the users. In addition; the system may trap email notifications from the case management/electronic case file (CM/ECF) system of the federal court system (and other similar systems such as State Courts electronic case filing systems). The alerts may also be derived from information retained by the system when the user uses the system to file documents electronically (e.g., using CM/ECF). Furthermore, the alerts may be generated from information retained as part of a PACER watch service. These processes are further discussed below. The information gathered from these various sources is used to produce and display the list of alerts 1202. The alerts to be reconciled that may be stored within the case management system 10 by court venue, case identifier, type of alert, etc.

Figure 13:
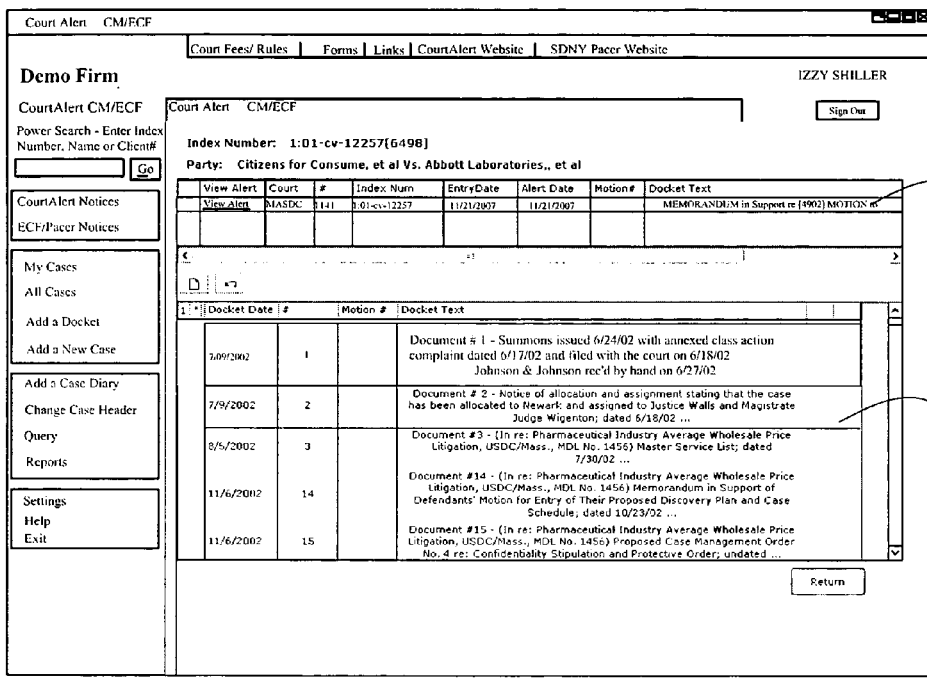

The alerts 1202 may be displayed on separate reconciliation screens, depending on whether the user selected alerts from a service provider or alerts from PACER or CM/ECF systems. The alerts may be color coded to indicate their source, for example as to whether they originated from a service provider, from the PACER system, or from another similar system. The alerts 1202 available for reconciliation may include certain information such as the case name, number or other identifying information, the type of the alert, and the date and time the alert was received, as well as information received from the court. The reconciliation screen 1200 may include an option to view the actual alert notice, which, when selected displays the content of the alert in a fashion similar to the initial receipt of the alert by electronic mail. The user may select one of the alerts 1202 by preferably placing the cursor over the alert 1202 and clicking on the mouse or by using a number of other conventional selection measures. The user may click on or otherwise activate the reconcile option 1208 as discussed above. As shown in FIG. 13, the docket records 1302 for the applicable case (i.e., the one associated with the selected alert 1202) are then displayed in an adjacent new window 1304.

Figure 14:
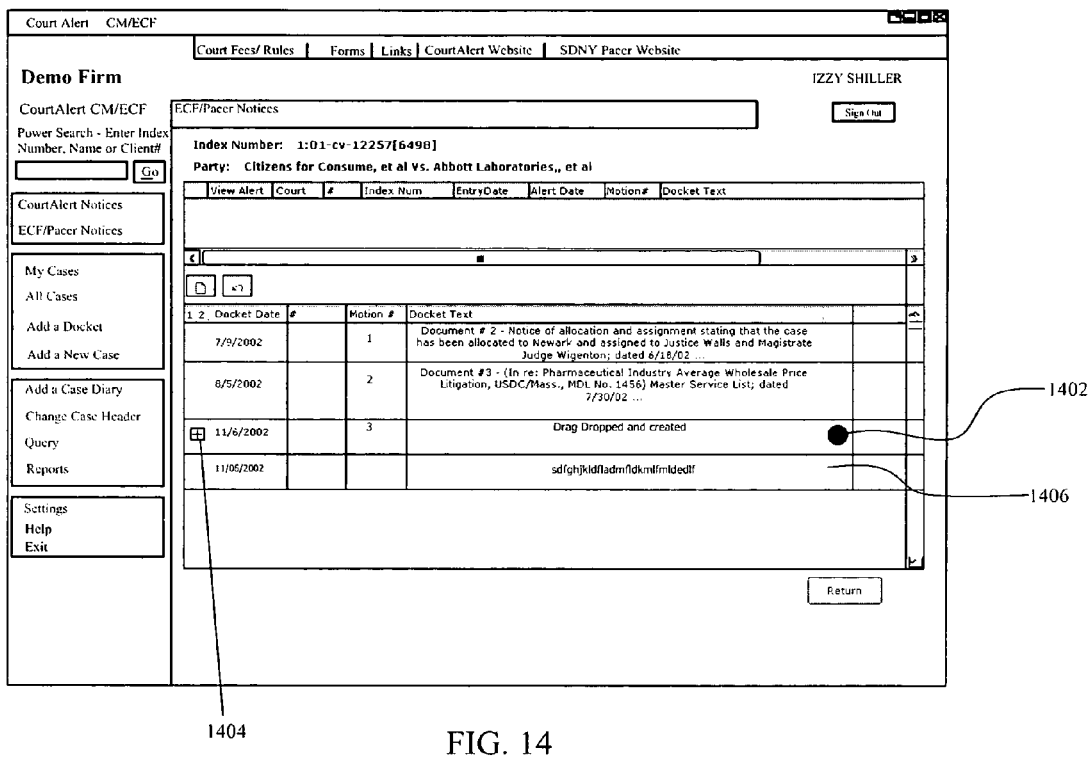
Figure 15:
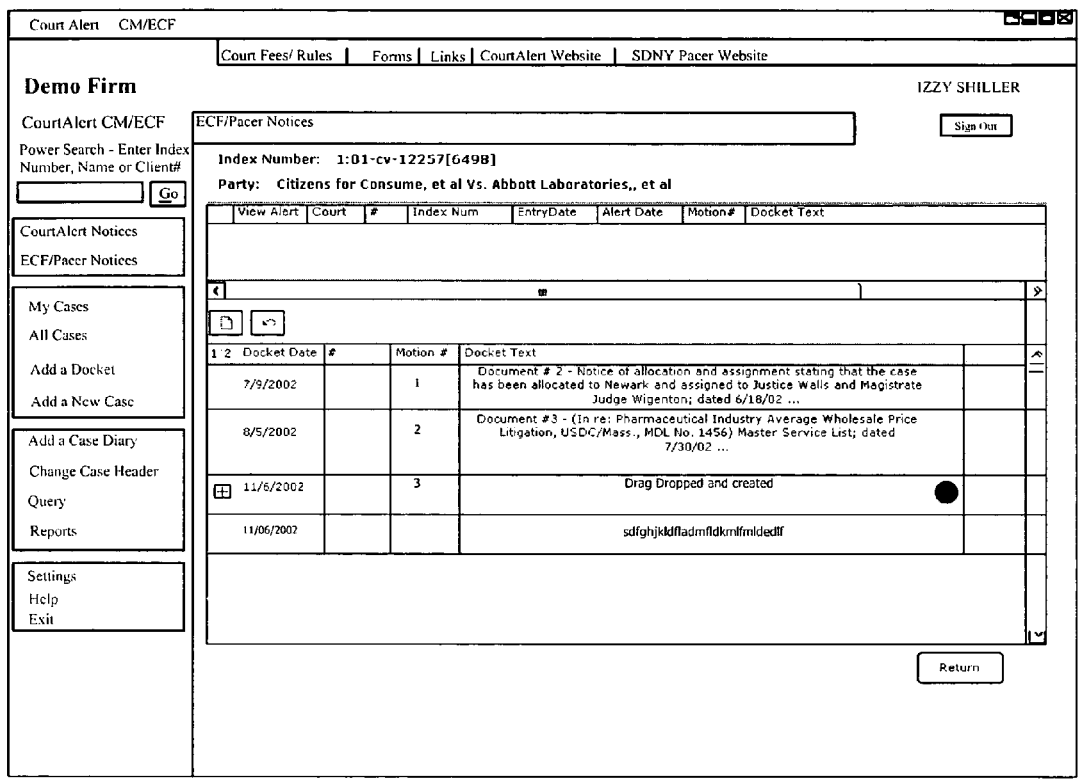

FIG. 14 illustrates one means for reconciling an alert 1202 with a previously entered docket record 1302. The user selects an alert 1202, drags the box containing the alert into the window 1304 containing the docket records for this legal case, and drops the alert box onto the applicable docket record. For example, an alert which confirms that a previously filed motion was received by the court may be reconciled with a docket record created by the user when the motion was initially prepared and filed. The case management system then creates an association between the docket record and the court sourced alert. Both the docket record and the associated court sourced alert are then accessible by court venue, case identifier, and docket sequence number, as well as in other methods. A number of other means to initiate the reconciliation process may be employed. The reconciliation screen may indicate that the reconciliation process has occurred by including a reconciliation symbol 1402 adjacent to or in the information box containing the docket record. The symbol 1402 may be coded (e.g., in color) to indicate whether the docket record was reconciled with a court sourced alert that originated from an alert notice from a service organization, from the PACER or CM/ECF Interface. The reconciled alert may then be displayed in a box 1406 near or adjacent to the associated docket record as illustrated in FIG. 14. An expansion symbol 1404 (for example the "+" sign) may indicated that the docket record is associated with a court sourced alert. Selection of this expansion symbol 1404 may cause the displayed alert to be concealed from display as illustrated in FIG. 15. The concealed court sourced alert information may be retrieved by selecting an option, for example, the "+" sign adjacent to the record as illustrated in FIG. 15. The reconciliation symbol 1402 remains when the applicable court sourced alert is concealed to allow the user to see at a glance the reconciled user dockets and to which court sourced alert they were reconciled. Once revealed, the court sourced alert information may again be hidden by selecting another option (the "+" sign) to hide the information behind the docket record.

Preferably, the reconciliation screen provides an option to "undo" the reconciliation process. In addition, court sourced alerts that have been reconciled are automatically removed from the top part of this reconciliation screen. A counter of unreconciled court sourced alerts may be included to indicate to the user how many court sourced alerts have yet to be reconciled with a previously entered docket record.

Based on a court sourced alert, a user can create a new docket record, as discussed above in connection with FIGS. 7-10. If the user creates a new docket record based on a court sourced alert, the resulting docket is automatically reconciled with the court sourced alert.

Based on the reconciled docket record, a user can create a new diary entry, which may include one or more assignments with applicable due dates, and which may be assigned to particular case team members. In addition, the user can use the information contained in the reconciled docket record to create an electronic mail message to members of the case team, which message may contain information from the reconciled docket record or the new diary entry.

As discussed above, a court sourced alert may be generated from a number of sources. The alert may be generated from manual or electronic monitoring of the court's records. The alert may then be automatically placed in the docketing database for display to the user. The alert may also be generated based upon information retrieved from the PACER system. The court sourced alert derived from the PACER system may include as an attachment an image of the related pleading, for example in a PDF format file. In addition, the alert may be generated by trapping e-mail messages from the courts' electronic filing systems. Upon receipt of a court sourced alert, the case management system attempts to deduct the legal event from the data contained within the alert. For example, the system may include a deduction process to determine what, if any, court information has changed—the type and form of the legal event represented by the information received from the court system. Using the New York State Supreme Court system as an example, if the "MTN" data table contains a valid and new value for a data element referred to as. "Order Date," and the data element referred to as "Decision Date" has the same value, then the deduction process determines that a Short Form Order, which was signed by the Judge, has been entered into the court's computer. If the Order Date has a valid and new value, but the Decision Date field is blank, the deduction process determines that a Settle/Submit instruction was issued by the Court and entered into the court's computer system. Alternatively, if the Order Date field has a valid value and the Decision Date field has a valid and new value that is different from the Order Date, the deduction process determines that a Settle/Submit final order was issued by the court and entered into the court's computer system. These are but a few examples. As is known, there are many deductible events and the design of an appropriate deduction process requires knowledge of the court workflow, the workflow at law firms and large legal departments, and details of the particular court's computer systems. With this knowledge, one skilled in the art can readily create a deduction process applicable to the appropriate circumstances. A court sourced alert may also be generated from an independent watch service, which provides information to the case management system 10 electronically. The source of each court sourced alert may be color coded on the display screens.

A production module that uses data from the court's computer system and databases within the case management system to generate e-mail notifications to subscribers with information related to the court event, in which such notifications contain relevant information such as modified user dockets (modified with information from the court sourced alerts) and diary notifications. The production module also generates information to store in one or more fields within a produced alert database table containing the information used to produce the alert.

The produced alert database table may also be used to provide information on a web site hosted by the service provider for access by users of the case management system. In addition, the produced alert database table may be electronically transmitted to users via FTP, ASP Upload or another suitable process. A user, for example a paralegal within a large law firm, may then use the electronically transmitted information with the case management system to update docket records and perform the reconciliation process.

Figure 16:
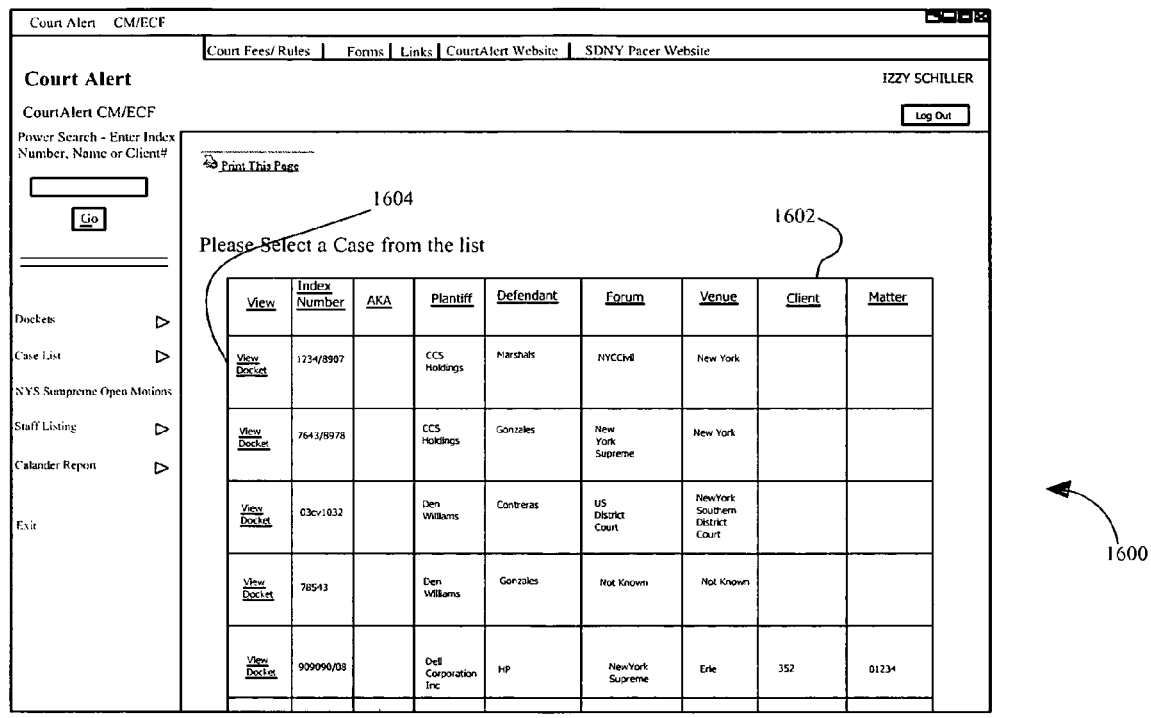
Figure 17:
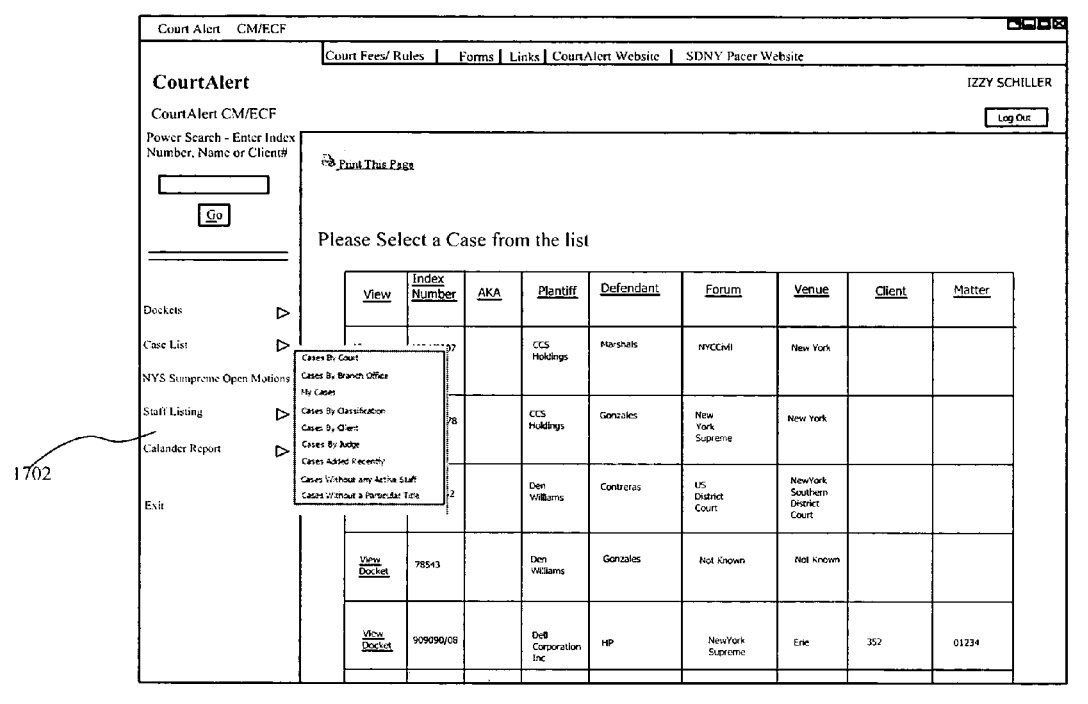

FIGS. 16-17 illustrate an inquiry function available through the case management system 10. The query screen 1600 illustrated in FIGS. 16-17 may be provided upon selection of the query button or icon displayed on the side bar 202 of the initial page 200. The query screen 1600 provides a table 1602 of information regarding each docketed case including an index number, plaintiff, defendant, forum, venue, client and matter reference numbers, and the like. The table 1602 may allow a user to call up dockets for a particular case by accessing one of the view dockets link 1604. As shown in FIG. 17, the query screen 1600 may include a side bar 1702, which allows the user to tailor the presentation of information in the table 1602. For example, selection of the Cases List icon on the side bar 1701 provides a menu 1704 that allows the user to select presentation of cases by various options such as court, office, team member, litigation type or client. Additional options available through the side bar 1702 may include a calendar report to view previously entered diary entries in monthly or agenda formats. The user can also view the diary entries in the calendar report belonging to colleagues in the same firm. The user can also export the diaries/deadlines to an outside program such as Microsoft Outlook. The report can be exported in various file formats.

The entries in calendar are styled in different colors to indicate whether the cases belong to a particular court. The user can utilize the inquiry program from any user client site 20 connected directly or remotely via the Internet. No special program needs to be installed on the inquiring user's computer. The program will work from any standard Internet browser such as Microsoft Explorer.

The case management system 10 may also include an online inquiry into the PACER system. For example, at a client site 20, the user may key in a venue and case index number. The system at the client site may then log onto the PACER system (using appropriate user id and password), retrieve the case information, and display such information to the user in a manner more convenient to the user than the standard PACER format. The inquiry program may include scanned documents filed with the court. The user can e-mail the last or all dockets from PACER, and include the retrieved document images.

PACER information for selected cases, such as all Federal District and Bankruptcy cases handled by the law firm, can be downloaded in batch into the Case Management system. Such download will typically include the case PACER headers, dockets and PDF files.

In a similar fashion, the case management system 10 may also include the ability to file documents electronically using CM/ECF. For example, a user may create a docket record, attach a file to such record (e.g., a PDF version of a pleading), and initiate a transfer of the file to the appropriate court through the use of CM/ECF system. In order to accomplish this function, the user will provide the system with his/her ECF username and password. Once the electronic file transaction is complete, the CM/ECF will confirm the transaction online in the conventional manner. The system will trap this confirmation information and use it as if it were a reconciled CM/ECF or PACER alert. The user docket previously created will be reconciled with this created alert and the staff team will receive notification with the confirmed docket. In addition to filing with the federal court systems, the system may also include means for interfacing with state court systems having electronic filing schemes.

The case management system 10 may also include a module for providing further information to users based upon newly created dockets. For example, when a new docket record is entered into the system, the system may automatically propose one or more diary entries, each with a future task and due date. The user will be provided with the ability to accept the proposed diaries and, if accepted, the system will then produce reminder notifications based upon the calculated due dates. The case management system may also display a list of rule(s) that it used to calculate the new task due dates. The user may then select a displayed rule, and the system will display the actual text of the rule. The rules may be displayed in a three-part window that includes portion for the text of the rule (e.g., from the Federal Rules of Civil Procedure, the Federal Rules of Appellate Procedure or the Bankruptcy Code), a portion for local court rules related to the main rule, and a portion to display any local judge rules or reminders. The system may also link the user to another website containing further information regarding the rule(s). In addition, the system may display a check list of proposed actions to be taken by the user I staff. The users may be able to modify the check lists in order to customize them for their specific law firm. These features may be implemented by providing a "smart" option as part of the system. Selection of this option for a particular docket record will display the proposed diary entries, the underlying rules, checklists and, if applicable, fill-in forms applicable to the document specified in the docket record.

Figure 18:
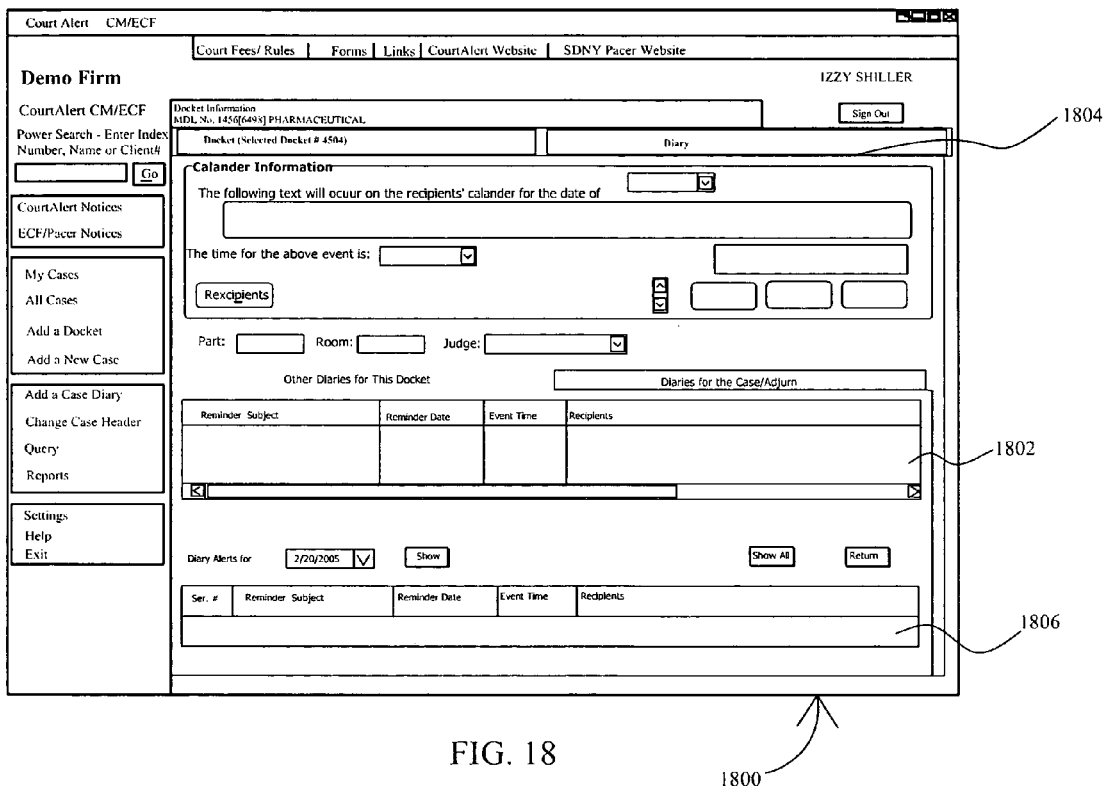
FIG. 18 is a screen capture of a page in the case management system providing proposed diary selections.

In order to provide this functional module, the system 10 may provide a diary screen 1800 as illustrated in FIG. 18. The diary screen 1800 may be provided when the user enters a new docket record. The diary screen 1800 has three components. The middle window 1802 of the diary screen 1800 includes proposed diaries related to the new docket record. Selection of one of the proposed diary entries in the middle window 1802 causes the proposed diary entry to be moved into the top window 1804. In the top window 1804, the user may modify the proposed diary entry, for example by altering the date of the entry, the list of recipients and the textual information associated with the diary entry. In the top window 1804, the user may then elect to add the new diary entry, which then causes the diary entry to be added to the list of diary entries shown in bottom window 1806.

The case management system 10 provides these tips or "smart" features, i.e., the ability to display rules and proposed diary entries, based on docket records. This is not simply a list of dates based on quantification of the applicable rules based on court and case type. For example, as each docket record is associated with—a legal document, the rules regarding the filing of the document are known. A database may be created which includes records for each type of legal document (e.g. a motion to dismiss a complaint) and entries for the rules associated with each type of legal document. The records within the database for a type of legal document may be further organized into groups and sub-groups so that certain legal documents associated with the same or similar legal rules may be associated and updated at the same time. The database may further include records for each type of legal document to support the proposed diary function. The entries within this database further include a due date, a text for the diary entry, and a formula for calculating the associated dates. For example, the formula would include the rule for calculating when a response to a filing is due based on the service date, the filing date, and the form of service (i.e., mail or in-person).

The case management system 10 provides for receiving emails, dissecting emails to obtain court related information for a docketing system. The information includes court name, index and description of the document, dates in a docket and a picture PDF. The case management system 10 can be operated by a human operator. The case management system 10 can search a PDF file for full text, docket entry and for any word on the document. Searchable PDF's are generated using OCR software. Software applications such as Adobe Acrobat can be used to create searchable PDFs. The user can use search facility provided by these software application to search for full text, docket entry, and for any word in the document. Plug-ins or add-ons are also available for these softwares. In case of web based case management system, the users can be provided with plug-ins and add-ons to view and search searchable PDF files. In addition, text versions of the PDF files are also provided to the user for searching. Using a web browser's searching facility, users can search for text, docket entry, and for any word in the document.

The case management system 10 provides for easy entry with information as to the type of the document, the person who directed that the document be written, and how the document as received. Various entries regarding information such as the type of the document, status or availability of lookup capability—includes feature such as hierarchical tree like structure of files, cross-site lookup etc, the name of the author, various dates relating to the documents, abstracts, summaries are entered. In addition, every case can be assigned a plurality of categories or tags. These categories or tags are used while retrieving and/or searching information about dockets. Furthermore, every entry made using the web form may also be given a unique field name, such as date of filing, last date of submission, name of the client, name of the judicial officer or judge and a search can be done based on these field names.

The case management system 10 also can determine how the document was received and locate the post mark for the document and display additional comments that are entered by hand in the docket.

The case management system 10 permits Court Alert® as well as the court to email to the case management system 19 and also permits emailing into the docket entry.

The case management system 10 provides for a web interface. New docket dates will be available immediately. Diary alerts can be entered. The case management system 10 can send emails to CourtAlert via computer. The case management system 10 also permits docket entries to be included into an existing entry with links to PDF files.

Using web interface that uses IMAP (Internet Mail Access Protocol) or RSS (Really Simple Syndication) but not limited to IMAP or RSS, new docket dates can be received or sent and diary alerts can be entered. The case management system 10 is configured to send auto-generated emails to alert providers via computer. The emails are generated when important changes that need to be notified are made in any docket or docket entry. In addition, these entries and emails, of course, can be made and prepared by human operators. The list of links to PDF files along with docket entries can be included into an existing entry either using a program or a web form that adds this new data.

The case management system is also configured to receive emails and newsletter etc. from authorized websites and alert systems. This incoming information in the form emails and newsletters etc. is received by the case management system and may be displayed in the form of docket entry or added to a docket entry. For this purpose, email clients or services such as IMAP, POP3 (Post Office Protocol 3), SMTP (Simple Mail Transfer Protocol) etc. may be used. RSS feeds can also be used to get this information.

Entries can be sent to blackberries or similar devices as an appointment by the case management system 10.

The case management system 10 will be able to go into outlook of an adjoined date and to interface with a blackberry, the case management system will extract and remove the original date and insert the new, adjourned to, date. A record of a document will be available through interne connection and the image of docket deadline will be available as well.

The case management system 10 will permit outside access to the internal firm docket under strict data security. In this way, a user can thus view everything internal to the firm from a remote location. The case management system 10 includes a three element that provides the relevant date in the same place including precise docket description, diary deadline, and a picture of document including a PDF file. The input mechanism of the docket text and diaries results in structured and standard text format.

The case management system 10 provides access permission that is role based and need based. Users, such as clients, lawyers, staff etc., using the case management system are assigned permissions based on their roles. For example, clients can be given access to the legal documents prepared. But access to internal office documents, data, and docket entries may be limited only to the internal staff. Again, certain privileged users within the organization may have access to every document and docket entry and certain users are given access to only those documents on which they are working or on a need to know basis. For this purpose, users may be divided into a number of categories. Each category is assigned different sets of access permission.

Brief summary of the document, detailed description of the document in text format is made available to the users along with the PDF file of the document, image date related to the document. Other entries such as diary deadlines, important filing dates are also provided. Each of these entries, documents and data is preferably categorized so that a particular category of data is visible or available to only certain category of users. The categorization of data is also important for better search results.

The case management system 10 includes a calendars and shows when a calendar deadline is emailed to another person.

The case management system 10 includes a diary that provides entry of court rules on responding to paper/document.

The case management system 10 provides for data conversion from Pacer to entry into the Invention's system. Data obtained from PACER (Public Access to Court Electronic Records) can be entered using a program or can be entered by a human operator.

Although the invention has been described with reference to a specific embodiment, as will be understood by those skilled in the art, other embodiments and variations may be made without departing from the spirit or scope of the invention. In addition, although the invention was described as a method and system for monitoring pending litigation cases, the invention is also useful in other fields and industries. For example, the method and system may be applicable to the pharmaceutical industry to support the integration and reconciliation of information from dispensed prescription medication databases.

The invention claimed is:

1. A method of computer-implemented legal case management comprising:

providing access to a computer network of multiple computers for receipt of information;

populating a database in a computer memory of one of the multiple computers with information from several different entities including at least a PACER system and a CM/ECF system, which information is about a plurality of different courts and for a plurality of court cases in each of the PACER and CM/ECF systems, and creating a docket record for each court case;

receiving a court sourced alert, the court source alert having an identifying information and event information, wherein the court sourced alert can be received from a source group, wherein the source group is selected from a group consisting of an independent alert service, an alert from the PACER system, and an alert from a CM/ECF system;

dissecting the identifying information to yield a determined court case from the plurality of different courts and the plurality of court cases;

extracting actual text and an image document from the court sourced alert to add the actual text and the image document to the docket record;

initiating a computer-implemented reconciliation process in which the event information associated with court sourced alerts from two or more of the source group consisting of the independent alert service, the Pacer system, and the CM/ECF system, are reconciled with the docket record, wherein reconciliation also includes a separate color code which color indicates the source group of the court source alert;

deducting an event from the event information of the docket record associated with the court sourced alert of the determined court case, wherein the deducting includes determining whether court information concerning a type and form of a legal event represented by the event information has changed; and generating and displaying a new docket record that includes the identifying information and the event information associated with the court sourced alert.

2. The method of computer-implemented legal case management of claim 1, further comprising indicating to a user, via a counter, an unreconciled court sourced alert.

3. The method of computer-implemented legal case management of claim 1, wherein a user is a person in at least one of a law firm and law department.

4. The method of computer-implemented legal case management of claim 1, further comprising displaying a check list of proposed actions based on the new docket record.

5. The method of computer-implemented legal case management of claim 1, wherein the event information is a pleading type and a pleading date.

6. The method of computer-implemented legal case management of claim 1, wherein the court sourced alert includes a case name, case number or other identifying information, type of alert and date and time alert was received.

7. The method of computer-implemented legal case management of claim 1, wherein if the event information is a valid, new value for a Court order date and a decision date has the same value, then it is deducted that a Short Form Order has been entered into a court computer system, and if the event information is a valid, new value for a Court order date and the decision date is blank, then it is deducted that a Settle/Submit has been entered into the court computer system, and if the event information is a valid, new value for a Court order date and the decision date has a valid, new value, then it is deducted that a final Settle/Submit Order has been entered into the court computer system.

* * * * *